Patented Aug. 17, 1954

2,686,791

UNITED STATES PATENT OFFICE 2,686,791

6-BETA-HYDROXY-17 ALPHA-METHYL-TESTOSTERONE, ITS ESTERS AND PROCESS

Herbert C. Murray, Hickory Corners, and Durey H. Peterson, Kalamazoo, Mich., assignors to The Upjohn Company, Kalamazoo, Mich., a corporation of Michigan No Drawing. Application January 15, 1953, Serial No. 331,493

9 Claims. (Cl. 260—397.4)

This invention relates to steroids and more particularly to certain testosterone derivatives namely 6β-hydroxy-17α-methyltestosterone and its esters represented by the following formula:

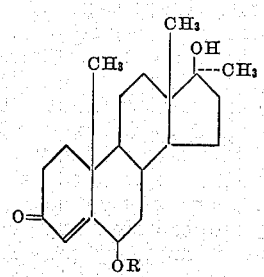

wherein R is hydrogen or the acid radical of an aliphatic or carbocyclic acid.

It is an object of this invention to provide the novel 6β-hydroxy-17α-methyltestosterone and its esters, and a process of preparing the same. Other objects will be apparent to those skilled in the art to which this invention pertains.

The novel compounds of the present invention may be prepared from 17α-methyltestosterone by the oxygenating action of a culture of fungus, particularly of the order Mucorales and the species *Rhizopus reflexus* as described in application S. N. 297,242, filed July 5, 1952, of which this is a continuation-in-part.

Esterification may be accomplished by admixing 6β-hydroxy-17α-methyltestosterone with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The following examples are illustrative of the process and products of the present invention, but are not to be construed as limiting.

*Example 1.—6β-hydroxy-17α-methyltestosterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with *Rhizopus nigricans* minus strain, American Type Culture Collection Number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Rhizopus nigricans* minus strain was added six grams of 17α-methyltestosterone in 120 milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives obtained upon evaporation of the methylene chloride solvent were taken up in benzene to leave a residue of benzene insoluble crystals. These were washed with additional benzene to give 550 milligrams of white crystals. Recrystallization from a mixture of equal parts of ethyl acetate and acetone gave 500 milligrams of crystals melting at 220 to 235 degrees centigrade. These were redissolved in three milliliters of methanol and ether was added to crystallization. The resulting crystals of 6β-hydroxy-17α-methyltestosterone weighed 212 milligrams and had a melting point of 247 to 252 degrees centigrade. Infrared and ultraviolet spectra verified the structure.

*Example 2.—6β-acetoxy-17α-methyltestosterone*

To fifty milligrams of 6β-hydroxy-17α-methyltestosterone dissolved in one milliliter of barium oxide dried pyridine was added one milliliter of a solution of 0.5 milliliter of redistilled acetic anhydride diluted to ten milliliters with dry pyridine and the reaction mixture maintained at room temperature for sixteen hours. The reaction mixture was then diluted to fifty milliliters and thereafter placed in a refrigerator for 24 hours. The thus-produced crystalline precipitate of 6β-acetoxy-17α-methyltestosterone was filtered, washed with four one-milliliter portions of ice water and thereafter dried in vacuum at sixty degrees centigrade. The product was dissolved in 1.5 milliliters of methanol, the resulting solution filtered and thereafter diluted with 0.5 milliliter of water whereafter there was precipitated crystals which were filtered, washed with three one-milliliter portions of ice water and thereafter dried at seventy degrees centigrade to yield 6β-acetoxy-17α-methyltestosterone.

*Example 3.—6β-formyloxy-17α-methyltestosterone*

In the same manner as Example 2, 6β-formyloxy-17α-methyltestosterone is prepared by reacting 6β-hydroxy-17α-methyltestosterone with an excess of formic acid.

*Example 4.—6β-propionyloxy-17α-methyltestosterone*

In the same manner as Example 2, 6β-propionyloxy-17α-methyltestosterone is prepared by reacting 6β-hydroxy-17α-methyltestosterone with propionic anhydride in pyridine.

*Example 5.—6β-(β-cyclopentyl)propionyloxy-17α methyltestosterone*

In the same manner as Example 2, 6β-(β-cyclopentyl)propionyloxy-17α-methyltestosterone is prepared by reacting 6β-hydroxy-17α-methyltestosterone with β-cyclopentylpropionyl chloride in pyridine.

*Example 6.—6β-benzoxy-17α-methyltestosterone*

In the same manner as Example 2, 6β-benzoxy-17α-methyltestosterone is prepared by reacting 6β-hydroxy-17α-methyltestosterone with benzoyl chloride in pyridine.

*Example 7.—6-keto-17α-methyltestosterone*

A solution of 100 milligrams of 6β-hydroxy-17α-methyltestosterone in two milliliters of glacial acetic acid was mixed with a solution of 25 milligrams of chromium trioxide in two milliliters of ninety percent acetic acid and maintained at room temperature for five hours. Then ten milliliters of methanol was added to the mixture which was subsequently concentrated under vacuum to remove most of the acetic acid and methanol. The residue was mixed with 25 milliliters of water and extracted with two fifty-milliliter portions of a mixture of five parts of ether and one part of methylene chloride. The combined extracts were washed twice with ten-milliliter portions of five percent sodium bicarbonate solution and three times with ten-milliliter portions of water. After drying over anhydrous sodium sulfate, the solvent was evaporated to leave a crystalline residue. Recrystallization twice from aqueous methanol yielded androgenic 6-keto-17α-methyltestosterone.

In a similar manner, other esters of 6β-hydroxy-17α-methyltestosterone are prepared according to acylation procedures, as illustrated above or by reaction with ketene, ketenes of selected acids, selected acids, acid anhydrides, or acid chlorides, in an organic solvent such as pyridine or the like. Representative esters of 6β-hydroxy-17α-methyltestosterone thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids having less than nine carbon atoms and which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, α and β-cyclopentylpropionyloxy, acrylyloxy, cyclohexylformyloxy, the half and diesters of polybasic acids, such as malonic, maleic, succinic, glutaric and adipic acids, and the like. The acids may also contain non-interfering substituents, such as mono or poly halo, chloro, bromo, hydroxy, methoxy, and the like if desired.

The 6β-hydroxy-17α-methyltestosterone and its carboxylic acid esters are useful chemical intermediates and have pharmacological activity per se. They exhibit androgenic, progestational and anaesthetic activity.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:
1. A compound represented by the graphical formula:

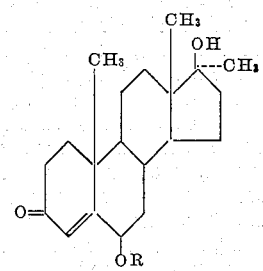

wherein R is selected from the radicals consisting of hydrogen and hydrocarboncarboxylic acyl radical containing less than nine carbon atoms.

2. 6β-hydroxy-17α-methyltestosterone.

3. 6β-acyloxy-17α-methyltestosterone wherein the acyl radical is that of an aliphatic hydrocarbon carboxylic acid containing less than nine carbon atoms.

4. 6β-acyloxy-17α-methyltestosterone wherein the acyl radical is that of a carbocyclic hydrocarbon carboxylic acid containing less than nine carbon atoms.

5. A 6β-acyloxy-17α-methyltestosterone represented by the structural formula:

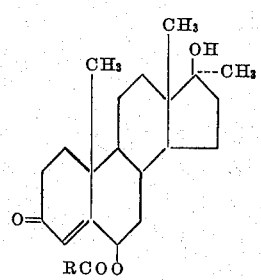

wherein R is a hydrocarbon radical containing less than eight carbon atoms.

6. 6β-acetoxy-17α-methyltestosterone.
7. 6β-propionyloxy-17α-methyltestosterone.
8. 6β-(β-cyclopentyl)propionyloxy - 17α-methyltestosterone.

9. A process of preparing a compound represented by the graphical formula:

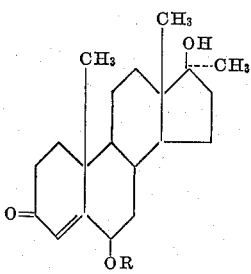

wherein R is a hydrocarbon-carboxylic acyl radical containing less than nine carbon atoms which comprises reacting 6β-hydroxy-17α-methyltestosterone with an acylating agent of a hydrocarbon-carboxylic acid containing less than nine carbon atoms.

No references cited.